United States Patent [19]

Hogan

[11] Patent Number: 5,581,596
[45] Date of Patent: Dec. 3, 1996

[54] METHOD FOR CONTROLLING CALL PROCESSING IN A MICROCELLULAR PERSONAL COMMUNICATIONS SERVICES SYSTEM

[75] Inventor: Jerry C. Hogan, Boulder, Colo.

[73] Assignee: U S West Technologies, Inc., Boulder, Colo.

[21] Appl. No.: 226,622

[22] Filed: Jun. 13, 1994

[51] Int. Cl.⁶ .................................................. H04Q 7/38
[52] U.S. Cl. ............................................. 379/59; 455/33.1
[58] Field of Search ................................ 379/58, 59, 60, 379/63; 455/33.1

[56] References Cited

U.S. PATENT DOCUMENTS

| | | | |
|---|---|---|---|
| 4,922,517 | 5/1990 | West, Jr. et al. | 379/58 |
| 4,979,094 | 12/1990 | Gemmell et al. | 364/188 |
| 5,109,403 | 4/1992 | Sutphin | 379/59 |
| 5,239,538 | 8/1993 | Teel, Jr. et al. | 370/58.3 |
| 5,253,253 | 10/1993 | Brame et al. | 370/85.11 |
| 5,388,456 | 1/1995 | Schatz et al. | 379/60 |
| 5,422,935 | 6/1995 | Spear | 379/63 |

OTHER PUBLICATIONS

Third IEEE Conference on Telecommunications article, "Service Control Point (SCP) for the GSM and Personal Communications Systems", Athanasopulos et al., 1991, pp. 12–17.

Electrical Communication article, "Cellular Mobile Radio as an Intelligent Network Application," Ballard et al., 1989, pp. 389–399.

IEEE Article, "Network Aspects of the GSM System", Audestad, 1988, pp. 462–465.

*Primary Examiner*—Dwayne D. Bost
*Attorney, Agent, or Firm*—Brooks & Kushman

[57] ABSTRACT

A method for controlling call processing in a microcellular Personal Communications Services (PCS) incorporating Distributed Radio Port Controller (D-RPC) architecture. The method is specifically adapted to effect the routing of voice channels when a call origination, call delivery, intra-RPC ALT or inter-RPC ALT is needed. The method is operable in conjunction with a PCS system which is connected to the Public Switched Telephone Network (PSTN) through an existing Central Office Switch (COS). The PCS system includes a plurality of Radio Port Controllers (RPCs) each having a corresponding plurality of Radio Ports (RPs) to define a plurality RPC serving areas for transmitting and receiving calls from mobile terminals registered therein. Radio Ports are monitored for any signals generated thereby which indicate that a mobile terminal is attempting to register on the PCS system, originate a call, initiate an ALT, or disconnect a call. A Visitor Location Register (VLR) is provided for managing call information regarding the mobile terminals registered in the RPC serving areas. The VLR is monitored for any inbound calls or signals generated by the VLR to obtain information as to how to proceed with a current activity. The VLR and Radio Port Signals are coordinated so as to determine and effect the routing of voice channels.

3 Claims, 5 Drawing Sheets

METHOD FOR CONTROLLING CALL PROCESSING IN A MICROCELLULAR PERSONAL COMMUNICATIONS SERVICES SYSTEM

TECHNICAL FIELD

This invention relates generally to mobile communications. More particularly, this invention relates to a method for controlling call processing in a Microcellular Personal Communications services (PCS) system which incorporates Distributed Radio Port Controller (D-RPC) architecture.

BACKGROUND ART

Wireless or "mobile" communications have been found to be of great value to station users who roam large geographic areas yet who desire immediate access to telephone services, especially in critical situations. Presently, the most common form of personal wireless communications are cellular telephones. Cellular telephones are, of course, operable in cooperation with known cellular networks which consist of four basic components: a Mobile Telephone Switching Center (MTSC), a cell site containing a controller and radio transceiver, system interconnections, and mobile or portable telephone units.

The MTSC is known to those skilled in the art as a digital telephone exchange which controls the switching between the Public Switched Telephone Network (PSTN) and the cell sites for all wireline-to-mobile and mobile-to-wireline calls as well as for mobile-to-mobile calls. The MTSC also processes mobile unit status data received from the cell site controllers, switches calls to other cells, processes diagnostic information, and compiles billing statistics.

In operation, when the MTSC receives a call for a mobile telephone user from the Public Switched Telephone Network, it deciphers the telephone number dialed by the wireline user and alerts the controllers at the cell sites to page the corresponding mobile unit. When a mobile telephone user places a call, the MTSC accepts the dialing data from the cell site controller and dials the desired number.

As referenced above, typical cellular networks include multiple adjoining cells each of which contains at least one cell site controller which operates under the direction of the MTSC. The cell site controller manages each of the radio channels at the site, supervises calls, turns the radio transmitter and receivers on and off, injects data onto the control and user channels, and performs diagnostic tests on the cell site equipment. Each cell contains one radio transmitter and two radio receivers. As those skilled in the art will further recognize, in operation both receivers are typically tuned to the same frequency, but the one receiving the stronger radio signal is continuously selected.

Each cell further has at least one radio channel that transmits control data to and receives control data from the mobile units. This control data tells the mobile unit that a call is coming from the MTSC or, conversely, tells the controller that a mobile telephone user wishes to place a call. To complete the connection, the controller uses the control channel to tell the mobile unit which user channel has been assigned to the call.

While cellular networks have been found to be of great value to mobile users whose travels span many miles, they have also been found to be prohibitively expensive to implement for small scale applications wherein system subscribers only desire wireless telephone services in a limited geographic area, such as, for example, within office buildings or in a campus environment.

The Personal Communications Network (PCN) is a relatively new concept in mobile communications developed specifically to serve the aforementioned applications. Like cellular telephony, a Personal Communications Network relates telephone numbers to persons rather than fixed locations. Unlike cellular telephones, however, the PCN phones are directed to small geographic areas thus defining "microcellular" areas designed to operate in similar to fashion to large scale cellular telephone networks. PCN technologies are also similar to residential cordless telephones in that both utilize base stations and wireless handsets. Unlike the former, however, PCN technology utilizes advanced digital communications features which may be implemented either as private networks or regulated services. When offered by communications carriers as services, this PCN capability is generally referred to as Personal Communications Services (PCS).

Microcellular Personal Communications Services (PCS) are expected to provide wireless access for an increasingly important segment of the communications market. Such PCS services therefore must meet the needs of the consumer market where expectations for good speech reproduction, immediate availability, low congestion, seamless handoff of all calls, and universal access are demanding.

There are presently in existence non-cellular, wireless PCN systems which require the design and implementation of complete overlaying networks to achieve the above-mentioned desired telephone services. See, for example, U.S. Pat. No. 4,980,907 issued to Raith et al and assigned to Telefonaktiebolaget L M Ericsson. This approach of providing a substantially new overlay of network components is, of course, highly expensive to implement and undesirable from a Local Exchange Carrier (LEC) perspective.

Consequently, a need has developed to provide a system and method for providing microcellular Personal Communications Services (PCS) which utilizes existing wireline switches for PCS deployment. More particularly, a need has developed to provide a Distributed Radio Port Controller (D-RPC) architecture which supports such a PCS system with minimal impact on the existing embedded base of switches. A need has further developed to provide a method for controlling call processing in such a system so as to properly effect the routing of the voice channels when a call origination, call delivery, intra-RPC automatic link transfer (ALT) or inter-RPC ALT is needed.

DISCLOSURE OF INVENTION

It is a principal object of the present invention to provide a method for controlling call processing in a microcellular Personal Communications Services (PCS) System.

Still further, it is an object of the present invention to provide a method as disclosed above which is specifically adapted to effect the routing of voice channels when a call origination, call delivery, intra-RPC ALT or inter-RPC ALT is needed.

It is a further object of the present invention to provide a method as disclosed above which is specifically adapted for use in a PCS system which is connected to the Public Switched Telephone Network (PSTN) through an existing Central Office Switch (COS) and which includes a plurality of Radio Port Controllers (RPCs) each having a corresponding plurality of Radio Ports (RPs) to define a plurality of RPC serving areas for transmitting and receiving calls from mobile terminals registered therein.

As disclosed herein, the Microcellular Personal Communications Services (PCS) System for which the method of call processing is directed is connected through an existing end office or Central Office Switch to a plurality of Radio Ports (RPs) each having a corresponding coverage area and providing in electrical communication with a corresponding Radio Port Controller (RPC). The RPCs are further provided in electrical communication with the central office switch and in electrical communication with each other to define a plurality of RPC serving areas for transmitting and receiving calls from mobile terminals registered therein.

In carrying out the above enumerated objects and other objects, features and advantages of the present invention, the method described herein further incorporates the provision of a Visitor Location Register (VLR) for managing call information regarding the mobile terminals registered in the aforementioned RPC serving areas. The VLR is further provided in electrical communication with the radio port controllers. The method described herein further includes monitoring the radio ports for any signals generated thereby, which indicate that a mobile terminal is attempting to register on the PCS system, originate a call, initiate an ALT or disconnect a call. The method further includes the monitoring of the VLR for any inbound calls or signals generated by the VLR to obtain information as to how to proceed with a current activity. Finally, the method contemplates the coordinating of the VLR and radio port signals to determine and effect the routing of voice channels when a call origination, call delivery, intra-RPC ALT or inter-RPC ALT is needed.

BEST MODES FOR CARRYING OUT THE INVENTION

Figure 1:
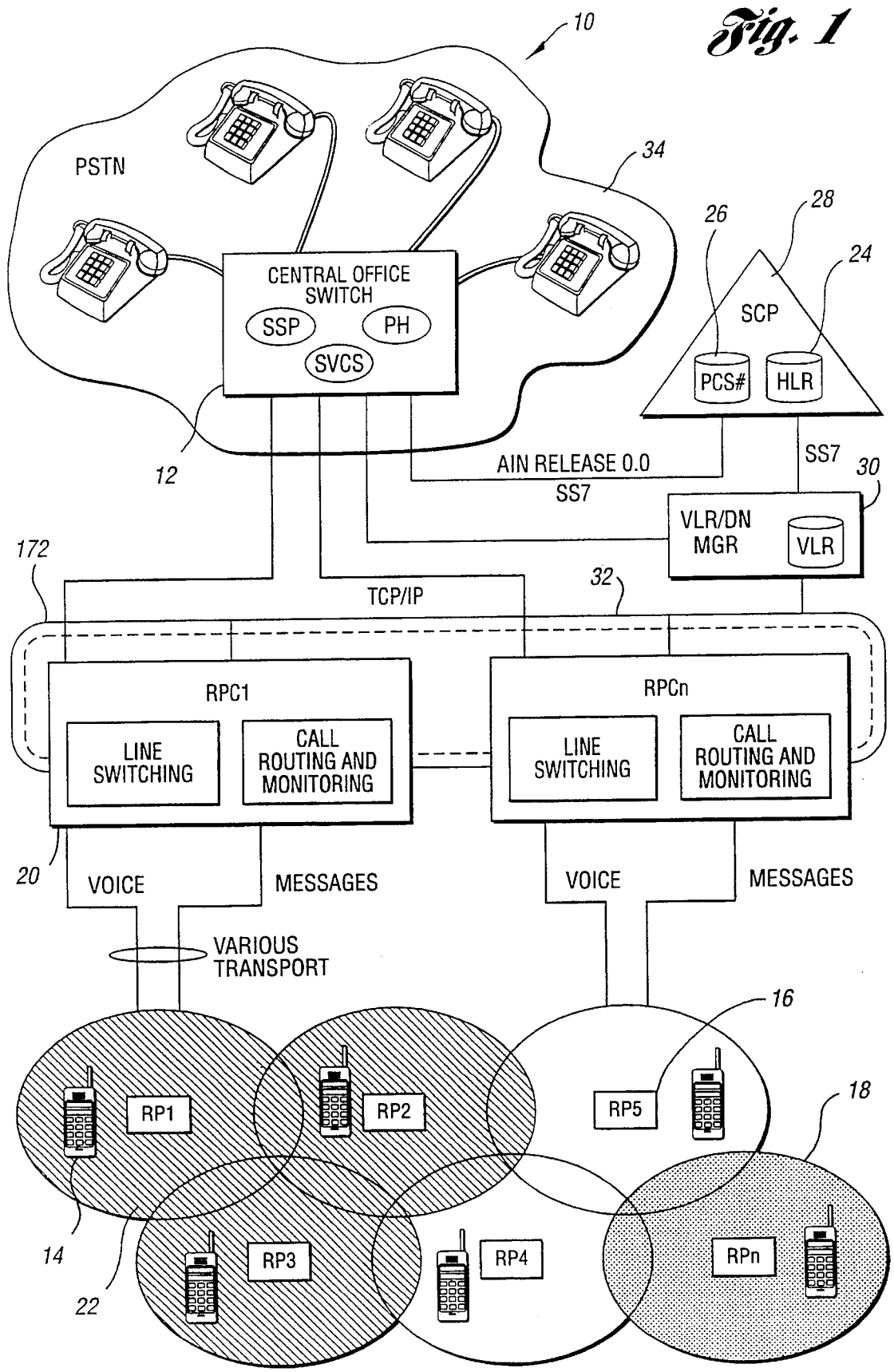
FIG. 1 is a schematic diagram of the PCS system to which the method of the present invention is directed.

With reference to FIG. 1 of the drawings, there is provided a schematic diagram of the system for which the method of the present invention is directed. The system is designated generally by reference numeral 10 and as shown, is adapted specifically for use in cooperation with the embedded base of existing wire line switches 12 found in a typical Local Exchange Carrier (LEC) of an Advanced Intelligent Network (AIN). As disclosed and further shown, switches 12 are adapted to provide Microcellular Personal Communication Services (PCS) to subscribers at mobile terminals 14.

To achieve the desired Automatic Link Transfer (ALT) functionality contemplated by the method of the present invention, there is provided a Distributed-Radio Port Controller (D-RPC) architecture which includes a plurality of Radio ports 16 (RP1, RP2, RPn), each having a corresponding cell or coverage area 18 which, in turn, are provided in electrical communication with a plurality of Radio Port Controllers 20 (RPC1, RPC2 . . . RPCn) so as to define a corresponding plurality of RPC serving areas 22 operative to receive and transmit signals from mobile terminals 14 which are registered therein.

In the preferred embodiment, wire line switches 12 are Class 5 Central Office Switches (COS) which are provided in electrical communication with each of the RPCs 20 via T1, PRI, BRI or TR 303 links or some combination thereof as may be required.

As recognized by those skilled in the art, the distributed radio port controller architecture shown in FIG. 1 is a modified hierarchical PCS network architecture in which the mobility functions, i.e. Automatic Link Transfers (ALTs), and some vertical features, e.g. call forward no answer, are handled by the Radio Port Controllers. Thus, the RPCs 20 are interconnected via voice and signaling circuits and use distributed processing techniques in accordance with the present invention to handle PCS mobility functions. This distributed processing, as disclosed herein, minimizes upgrades to the embedded base of existing wireline switches 12.

As referenced above, RPCs 20 of the distributed radio port architecture disclosed in FIG. 1 are interconnected via voice and signaling circuits. More particularly, they are connected via either analog voice channels and a datalink for message transport or Integrated Services Digital Network (ISDN) links (multiple BRI connections or a single PRI). Each RPC 20 may also be connected to other RPCs using a Metropolitan Area Network (MAN) 172, isochronous 802.6 or isochronous Ethernet (10 Mb25), TR303 or other facility which allows the transport of voice and data between RPCs 20. Such a configuration permits the RPCs to operate in a distributed fashion as referenced above.

Still referring to FIG. 1, it is seen that the PCS system to which the method of the present invention is directed is adapted to be used with existing wire line switches 12 which are preferably, but not necessarily, ISDN capable switches with the packet handling (PH) capabilities of ISDN. Switches 12 are also Signaling Service No. 7 (SS7), Service Switching Points (SSPs) and are adapted to communicate with a Service Control Point (SCP) 28 with AIN 0.0 messages via SS7 network links. Switches 12 are responsible for providing some of the services of the network, like call-waiting, to the subscriber. Other elements in the architecture may also support subscriber services.

As further shown in FIG. 1, this system incorporates at least one Home Location Register (HLR) 24 for storing and providing subscription data and keeping track of the RPC serving areas 22 where the mobile terminals 14 are registered in order to deliver calls thereto. There is further provided a PCS # database 26 for storing a list of Universal Personal Telephone (UPT) numbers which have been assigned to the PCS subscriber and to map the UPT numbers to the locations of their corresponding HLR. As seen, Service Control Point (SCP) 28 is also provided in electrical communication with switch 12, HLR 24 and PCS # database 26. In operation, SCP 28 is operable to query the HLR 24 for routing information and to provide the same to the switch 12.

Also shown in FIG. 1 is a Visitor Location Register/ Directory Number (VLR-DN) manager 30 which is provided in electrical communication with switch 12, HLR 24 and the plurality of RPCs 20. The VLR-DN manager 30 is operable to store information regarding the RPCs currently anchoring PCS calls. This information includes temporary routing number, current terminal location, service profile and handover (ALT) activity. As appreciated by those skilled in the art, VLR-DN manager 30 disclosed herein is part of the PCS system of FIG. 1 and has the traditional functionality of a cellular VLR [IS-41] component plus the added functionality of managing (assigning and unassigning) temporary routing directory numbers (DN) for PCS calls. The VLR-DN managers 30 are associated with a selected number of RPCs 20 based on their own message handling capacity. Significantly, the VLR-DN managers 30 are fault-tolerant computing platforms that may be readily upgraded to provide PCS capabilities. As shown, the VLR-DN manager 30 has a signaling connection 32 to each of its associated RPCs.

Significantly, VLR-DN manager 30 may reside on the class 5 central office switch 12 or may be a separate network element. Some means must exist, however, for sending messages between RPCs 20 and VLR-DN managers 30. In keeping with the invention, applicants contemplate that an Ethernet might be utilized. However, the message forwarding means may comprise an X.25 via a separate link or an ISDN D channel if the VLR-DN manager 30 resides on switch 12, as well as any other mode of message transport.

It should be understood that HLR 24 and PCS # database 26 may reside on the same SCP 28 as shown, or on different SCPs. In operation, the SCP 28 which is preferably an AIN release 0.0 SCP, is responsible for providing routing information for an originating switch as referenced above.

In keeping with the invention, the method disclosed herein provides four basic functions in the above-disclosed Personal Communications Service Network. Namely, the method provides an interface to radio ports 16 consisting of support of a set of messages to control call processing between RPs 16 and RPCs 20 and to further support some form of voice transport. Still further, the present invention provides an interface to the VLR-DN manager 30 consisting of support of a set of messages to control call processing between the Public Switched Telephone Network 34 and the mobile terminal user 14.

The above functionality supports an interface to the RPs 16 which is most likely BRI or PRI or TR303 and which utilizes analog lines for voice and synchronous data-links using X.25 packets for control messages. This set of messages or call flows govern the calls controlled between the RPCs 20 and the RPs 16 and are currently contemplated to be handled by X.25 packets as referenced above. However, it is anticipated that in future versions, the ISDN D channel may be utilized for this purpose. In operation, the RPCs 20 are flexible enough to support a variety of call flow scenarios, although not simultaneously, such that a variety of RP hardware can be supported. Applicants thus contemplate that Bellcore's generic criteria for wireless access communications systems (WACS), TA-NWT-001313 may be implemented as the preferred interface to a radio port.

As further referenced above, the RPC functionality of the present invention must further support an interface to VLR-DN manager 30. This interface may be ISDN, X.25, Ethernet, or any other suitable data transmission facility. At present, applicants contemplate that the interface will utilize an Ethernet using a TCP/IP socket interface. It should be noted that this interface is strictly a datalink with the data being a set of messages that are used for call origination, call delivery, call disconnect, Automatic Link Transfers (ALT)—sometimes called handoff or handover, subscriber information requests, etc. As presently understood, in the normal flow of events, the VLR-DN manager 30 will operate to notify the RPCs 20 of calls inbound for radio subscribers or the RPCs 20 will notify the VLR-DN manager 30 of calls originating from radio subscribers 16. This notification is accomplished through the implementation of a set of call flows and their associated messages as disclosed in further detail below.

Figure 2:
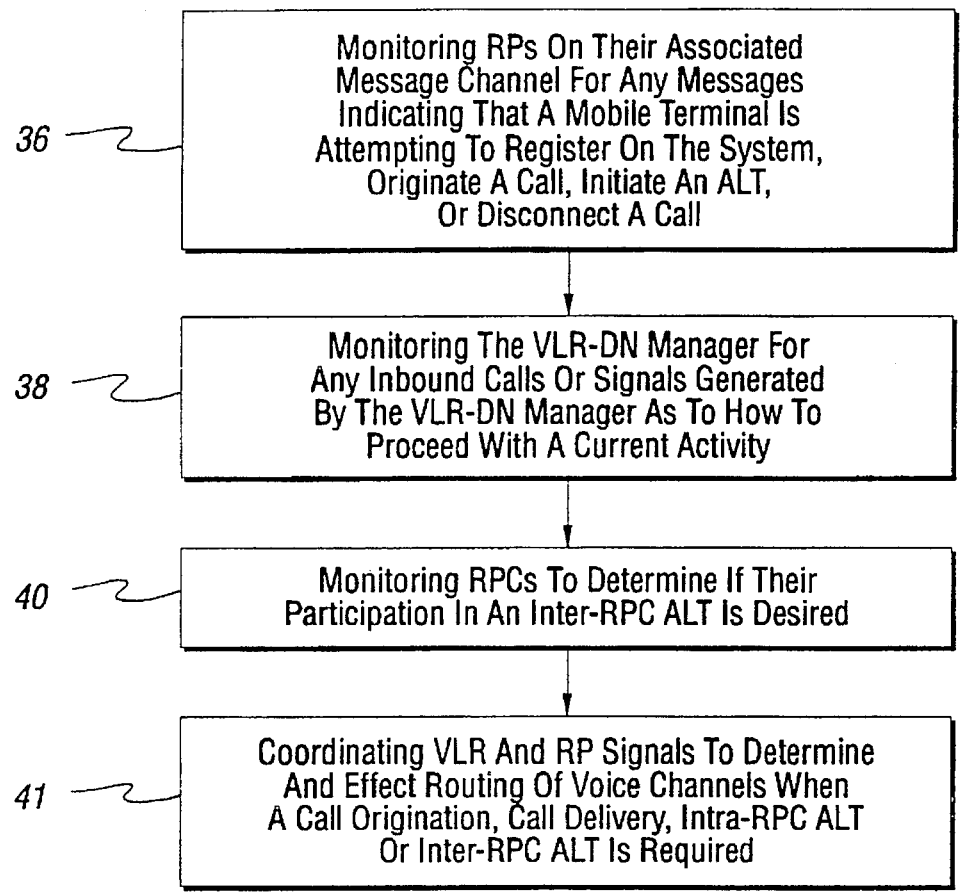
FIG. 2 is a block diagram of the method steps of the present invention.

With reference now to FIG. 2 of the drawings, the preferred functionality of RPCs 20 may be described in further detail. As referenced above, the primary function of RPCs 20 is the routing of calls between the RP voice channels and the voice channels appearing from the central office switch 12, which is preferably a Telco switch. This is, of course, a somewhat simplistic view of the RPC functionality. In reality, RPCs 20 actually perform a number of functions just to accomplish the aforementioned objective. These functions include monitoring RPs 16 on their associated message channel for any messages, i.e. signals generated by RPs 16 indicating that a mobile terminal 14 is attempting to register on the system, originate a call, initiate an ALT, or disconnect a call, as shown in block 36. As further shown in block 38, RPCs 20 further perform the function of monitoring the VLR-DN manager 30 for any inbound calls or signals generated by VLR-DN manager 30 as to how to proceed with a current activity. Still further, as shown in block 40, RPCs 20 monitor other RPCs in the event that they must participate in an inter-RPC ALT. Finally, as shown in block 41; RPCs 20 coordinate VLR and RP signals to determine and effect routing of voice channels when a call origination, call delivery intra-RPC ALT or inter-RPC ALT is required.

In the preferred embodiment, RPCs 20 provide the switching fabric required to accomplish the routing mentioned above. As presently contemplated by applicants, this switching fabric is 96×96 and supports up to 48 simultaneous calls. Applicants recognize, however, that in future implementations, the switch matrix may be required to be 1024×1024 or 2048×2048 to support expected deployment requirements.

In operation, RPCs 20 interface to some Operational Support System (OSS) from which receipt configuration information, requests for metric dumps, diagnostic instructions, etc. may be communicated At present, it is contemplated that the interface to the OSS will be an asynchronous link such as an X.25 packet or an ethernet. However, any form of suitable datalink may be utilized.

In keeping with the invention, the RPCs 20 provide local administrative and diagnostic capabilities. Thus, for example, a Graphical User Interface (GUI) may be used to provide technicians with a direct view to the status of the RPCs 20 while they are running and to permit the technician to establish routes for testing.

In further keeping with the invention, RPCs 20 permit logging and recording of metrics and other operational data locally. As those skilled in the art will recognize, this information may be needed to be stored for long periods of time such as 60 days or more. Thus, it is both desirable and necessary that the RPCs 20 have sufficient disk storage locally to support such activity. It is further contemplated that RPCs 20 may be adapted to provide periodic self-diagnostics and, in such cases, would thus be equipped with the ability to shut down portions that are determined to be unsupported or flawed. As readily seen, discovered errors would be required to be alarmed such that the OSS is made aware of the problem at the earliest possible time.

Operation

1. Call Origination

Figure 3:
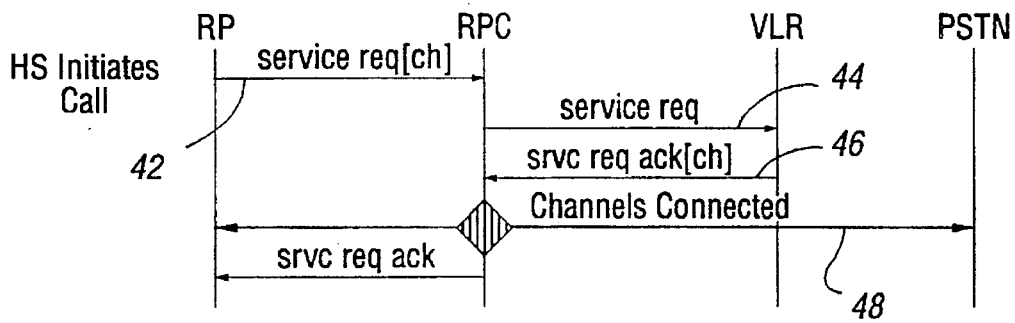
FIG. 3 is a schematic diagram illustrating the coordination of VLR and RP signals to determine and effect the routing of voice channels during call origination.

With reference now to FIG. 3 of the drawings, the step of coordinating VLR and RP signals to determine and effect the routing of voice channels when a call origination is needed will be described in further detail.

As shown, in this situation, an RPC associated with a selected RP sees a mobile terminal attempting call origination through detection of a service request signal 42 generated at the radio port which contains a channel from the RP which the RP has selected to use for the voice portion of the call. Upon receipt of this service request signal, the RPC requests that the VLR assign a network channel over which to place the call. As shown in FIG. 3, this request takes the form of a network channel request signal 44 generated by RPC 20 for receipt VLR-DN manager 30. Upon receipt of the service request signal, VLR-DN manager 30 generates a corresponding service request acknowledgement signal 46 for receipt by the RPC. This service request acknowledgement signal includes information identifying the assigned network channel. Thereafter, the RPC internally connects the assigned voice and network channels as shown by the dashed arrow 48.

2. Call Termination

Figure 4:
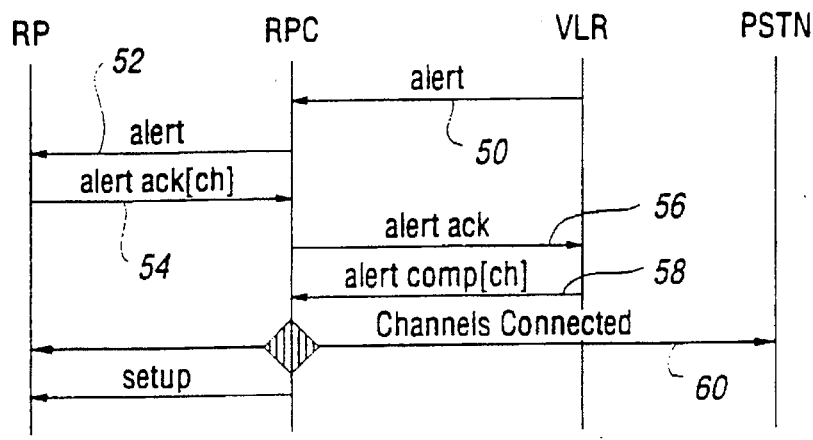
FIG. 4 is a schematic diagram illustrating the coordination of VLR and RP signals to determine and effect the routing of voice channels during call termination.

Referring now to FIG. 4 of the drawings, the step of coordinating VLR and RP signals to determine and effect the routing of voice channels will further be described with reference to call delivery connections.

In these situations, the RPC receives an alert from the VLR-DN manager 30 and forwards the alert to the RPs in its area. These alert signals are shown at 50 and 52 in FIG. 4. In operation, the RP that locates the user, i.e. the mobile terminal, responds with a first acknowledgement signal 54 which includes a voice channel assignment for the delivery of the call. Upon receipt of this first acknowledgement signal, the RPC generates and forwards a second acknowledgement signal 56 for receipt by the VLR-DN manager 30 confirming receipt of the aforementioned alert signals. The RPC acknowledges the alert from the VLR-DN manager and the VLR-DN manager responds by generating a response signal 58 for receipt by the RPC which identifies the PSTN channel of the incoming call. Thereafter, the assigned voice and network channels are internally connected at the RPC to complete the call through the anchor RPC as shown by dashed arrow 60.

3. Intra-RPC ALT via MAN

Figure 5:
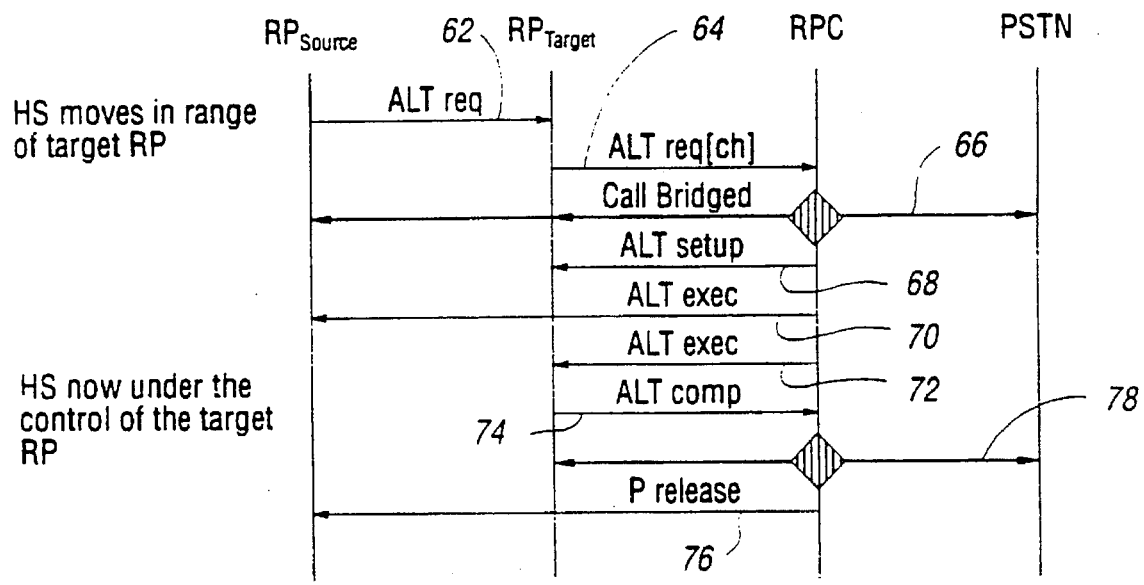
FIG. 5 is a schematic diagram illustrating the coordination of VLR and RP signals to determine and effect the routing of voice channels during an intra-RPC automatic link transfer (ALT)

Referring now to FIG. 5 of the drawings, the operational steps of coordinating VLR and RP signals to determine and effect the routing of voice channels when an intra-RPC ALT is needed will be described.

As those skilled in the art will recognize, in an intra-RPC ALT, i.e., one where the source and target RPs are connected to the same anchor RPC, the movement of the mobile terminal causes the same to request an ALT to the target RP. This action causes the target RP to issue a first ALT request signal 62 at the mobile terminal for receipt by the target RP. This first ALT request signal 62 identifies the voice channel of the current call. Following receipt of the above ALT request signal, the target RP assigns a secondary voice channel and generates a second ALT request signal 64 for receipt by the corresponding RPC. This second ALT request signal identifies the assigned channel and requests that the RPC bridge the call. Such bridging is accomplished by establishing an internal conference connection between the source RP and the target RP at the RPC as shown by dashed arrow 66.

Thereafter, the RPC generates an ALT setup signal 68 for receipt by the target RP which is followed by a first ALT execute signal 70 and a second ALT execute signal 72, both of which are generated at the RPC and are directed for receipt by the target RP and the source RP, respectively. Finally, an ALT complete signal 74 is generated at the target RP for receipt by the RPC and the source RP is disconnected from the RPC. Thereafter, a release signal 76 is generated at the RPC for receipt by the source RP which instructs the latter to release all resources previously associated with the call. As readily seen, in such a manner, the target RP assumes the responsibility of a source RP in the current call and the target RP is provided in communication with the PSTN through the anchor RPC as shown by dashed arrow 78.

4. Inter-RPC ALT via MAN (2 RPCs)

Figure 6:
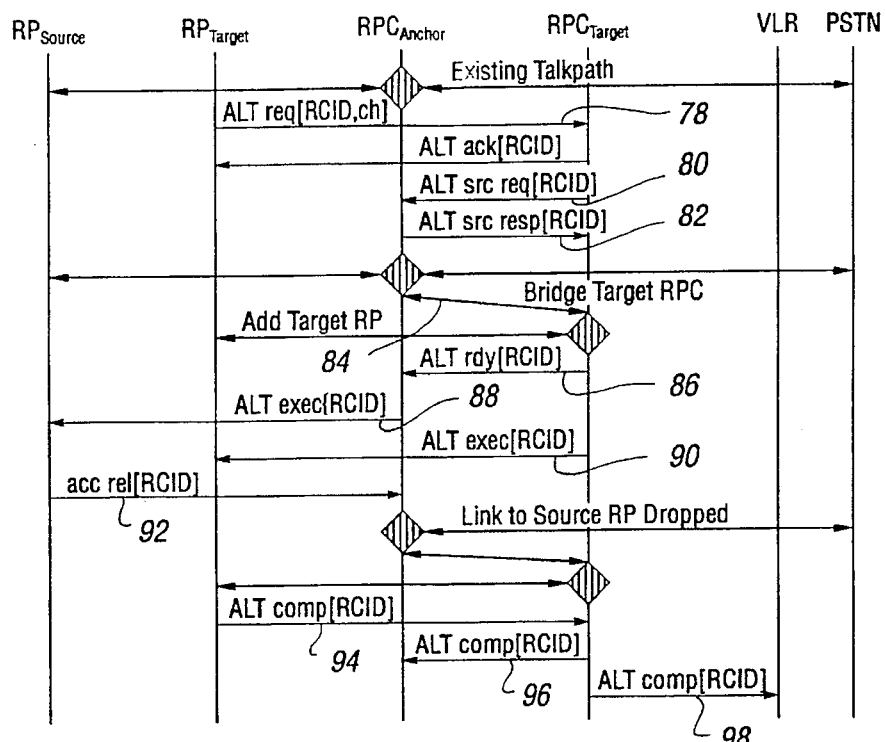
FIG. 6 is a schematic diagram illustrating the coordination of VLR and RP signals to determine and effect the routing of voice channels during an inter-RPC (ALT) via a Metropolitan Area Network (MAN)

Referring now to FIG. 6 of the drawings, the step of coordinating VLR and RP signals to determine and effect the routing of voice channels in an inter-RPC ALT will be further described.

In this preferred embodiment, the RPCs 20 are understood to be provided in electrical communication with each other via a Metropolitan Area Network (MAN). As referenced above, however, it is recognized and understood that any other suitable connection may be utilized such as, for example, various ISDN call setup methods and user-to-user information exchanges over the ISDN and D channel with voice carried over the ISDN B channels.

As shown in FIG. 6, when a mobile terminal moves into the cell of an RP that is connected to a RPC other than the one that was handling the current call, i.e. other than the anchor RPC, the target RPC must effect a link back to the anchor RPC. This link back must be provided such that the call may be continued without lapse of service. While not shown in FIG. 6, it is understood that a first ALT request signal must, of course, be generated at the mobile terminal for receipt by the target RP so as to identify both the voice channel and the Radio Call Identifier (RCID) of the current call anchored at the anchor RPC.

In keeping with the invention, in this scenario the target RP must thereafter send the target RPC an ALT request which includes the channel designation for the channel to be used for the call. Thus, the target RP must assign a secondary voice channel and generate a second ALT request signal 78 for receipt by the target RPC identifying the assigned channel and the call RCID. As shown, the target RPC may respond to the target RP with an ALT acknowledge signal 79. The target RPC must thereafter locate the anchor RPC by generating an ALT source request signal 80 at the target RPC for receipt by all known RPCs. This ALT source request signal identifies the RCID of the call anchored at the anchor RPC. The anchor RPC then replies by generating an ALT source response signal 82 for receipt by the target RPC. This source response signal identifies the call RCID and a logical channel on the MAN over which to receive voice signals. Thereafter, the anchor RPC bridges the call to the identified MAN channel so as to establish a conference connection between the target RP, the target RPC, and the anchor RPC as shown by dashed arrow 84.

In keeping with the invention, upon completion of the call bridge, the target RPC generates an ALT ready signal 86 for receipt by the anchor RPC. Upon receipt of this ALT ready signal, the anchor RPC generates a first ALT execute signal 88 directed for receipt by the source RP. The target RPC similarly generates a second ALT execute signal 90 for receipt by the target RP. The source RP responds with an access release which takes the form of an access release signal 92 directed to the anchor RPC. This access release signal instructs the source RP to release all radio resources associated with the RCID of the call. Thereafter, ALT complete signals 94, 96 and 98 are generated at the target RP for receipt by the target RPC as well as at the target RPC for receipt by the anchor RPC and the VLR-DN manager 30.

5. Inter-RPC ALT via MAN (3 RPCs)

Figure 7:
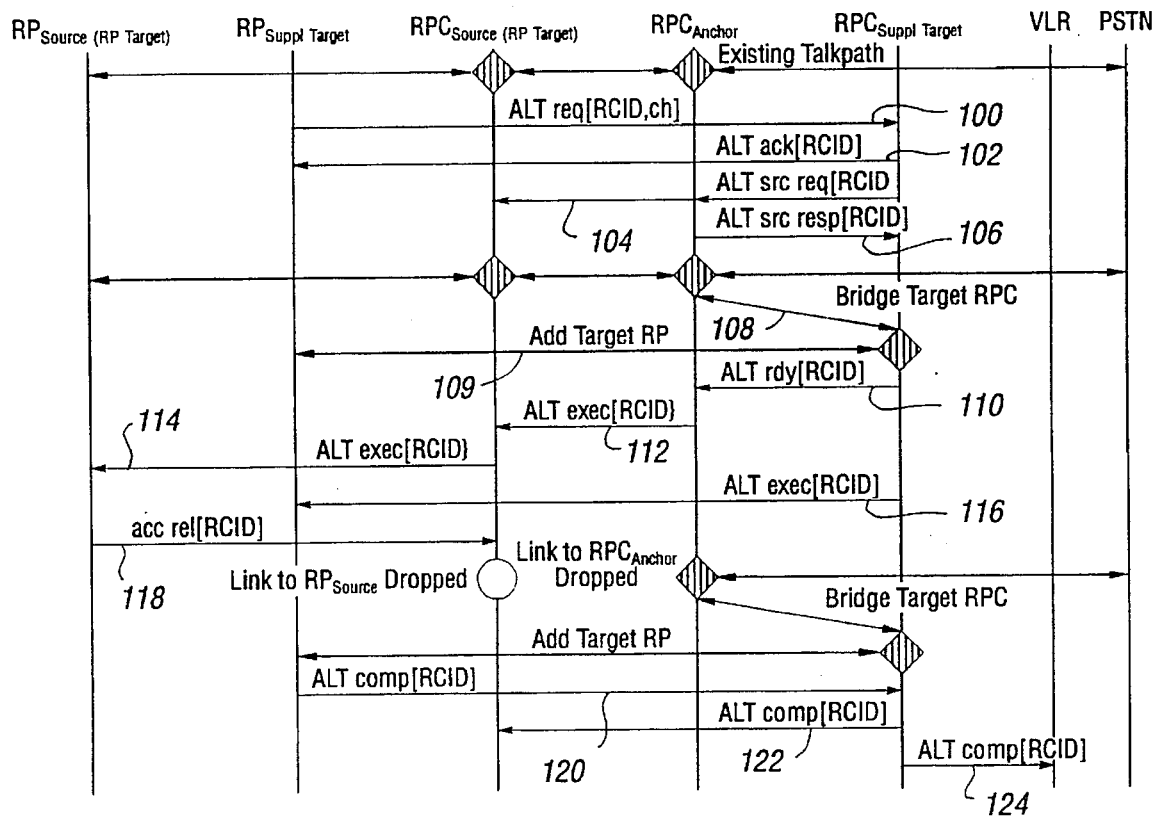
FIG. 7 is a schematic diagram illustrating the coordination of VLR and RP signals in to determine and effect the routing of voice channels during an inter-RPC ALT via MAN to supplemental RPs and RPCs.

As contemplated by the present invention, situations may arise when a user is very mobile on an extended call. In such cases, the handset, i.e. mobile terminal 14 may have already performed an ALT from a serving area of the anchor RPC to the serving area of first target RPC and may be about to move into the serving area of a second or "supplemental" target RPC. This scenario will be described in further detail with reference to FIG. 7 of the drawings.

As shown, to effect this ALT, the supplemental target RP must assign a supplemental voice channel and generate a supplemental ALT request signal 100 for receipt by its corresponding supplemental target RPC identifying the assigned channel. The supplemental target RPC may respond by generating a supplemental acknowledgement signal 102 for receipt by the supplemental target RP. The supplemental target RPC must thereafter locate the anchor RPC by sending a message over the MAN containing the RCID of the call to all known RPCs. This message takes the form of a supplemental ALT source request signal 104 which, as referenced above, is generated at the supplemental target RPC for receipt by all of the RPCs.

In operation, the anchor RPC then replies with a message containing the RCID and a logical channel on the MAN over which to receive the voice signal. This reply takes the form of a supplemental ALT search response signal 106 which as referenced above is generated at the anchor RPC for receipt by the supplemental target RPC.

In operation, the anchor RPC then bridges the call to this MAN channel so as to establish a conference connection to the supplemental target RPC and the anchor RPC as shown by dashed arrow 108. The supplemental target RPC bridges the call from the anchor RPC to the assigned channel to the target RP as shown by dashed arrow 109.

The supplemental target RPC then replies to the anchor RPC by generating a supplemental ALT ready signal 110 upon completion of the call bridge. Thereafter, the anchor RPC generates a supplemental ALT execute signal 112 for receipt by the source RPC. Next, the source RPC generates a second supplemental ALT execute signal 114 for receipt by the source RP. Then, the supplemental target RPC generates a third supplemental ALT execute signal 116 for receipt by the supplemental target RP. The source RP thereafter responds by generating a supplemental access release signal 118 for receipt by the source RPC instructing the source RPC to release all radio resources associated with the RCID of the call. Finally, the supplemental target RP sends a supplemental ALT complete signal 120 to the supplemental target RPC which in turn sends supplemental ALT complete signals 122 and 124 to the anchor RPC and the VLR-DN manager 30, respectively.

6. Inter-RPC ALT Via ISDN/PRI Using Switch Loopback (2 RPCs)

Figure 8:
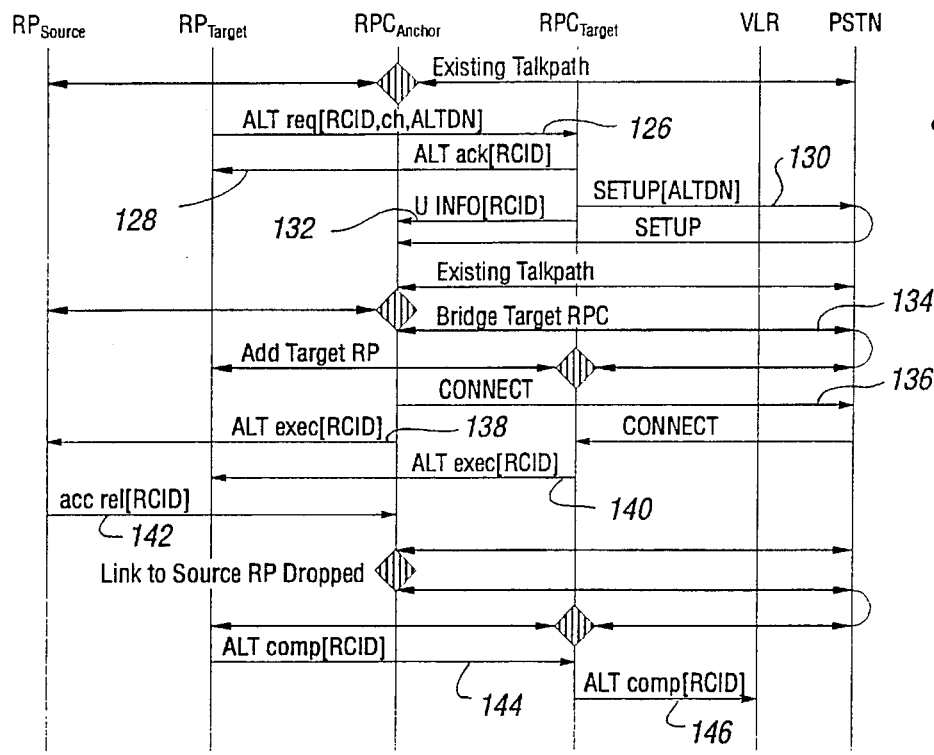
FIG. 8 is a schematic diagram illustrating the coordination of VLR and RP signals to determine and effect the routing of voice channels in an inter-RPC ALT via ISDN/PRI using switch loopback.

Referring now to FIG. 8 of the drawings, the step of coordinating VLR and RP signals to determine and effect the routing of voice channels when an inter-RPC ALT is needed will be further described with reference to a situation wherein the RPCs are provided in electrical communication with each other via an ISDN link.

As described, the method is known as a "switch loopback" which is recognized by those skilled in the art as a method by which an RPC may accomplish ALTs via ISDN circuits using standard ISDN call setups and user-to-user messaging. As shown in FIG. 8, in this scenario, the target RP sends the target RPC an ALT request with a channel designation for the channel to be used for the call and the ISDN DN of the anchor RPC (ALTDN). This request takes the form of a first ALT request signal 126. The target RPC replies to the anchor RPC by assigning a secondary voice channel and generating an ALT acknowledgement signal 128 for receipt by the target RPC. As shown, this ALT request signal identifies the assigned channel, the call RCID, and the ALTDN.

The target RPC thereafter issues an ISDN call setup signal 130 for receipt by the Central Office Switch (COS) through the public switched telephone network. This ISDN call setup signal requests the COS to setup a new call from the target RPC to the anchor RPC. The call setup is followed by an ISDN user information signal 132 generated at the target RPC for receipt by the anchor RPC. In operation, when the anchor RPC receives the setup from the switch, it bridges the existing talk path to the DN of the call inbound from the target RPC as shown by dashed arrow 134 and generates a first connect signal 136 for receipt by the COS. The anchor RPC further generates a first ALT execute signal 138 for receipt by the source RP. After receiving this connect message from the COS, the target RPC generates a second ALT execute signal 140 for receipt by the target RP. The source RP responds by generating an access release signal 142 for receipt by the anchor RPC instructing the anchor RPC to release all radio resources associated with the RCID of the call. Thereafter, the target RP generates a first ALT complete signal 144 for receipt by the target RPC and the target RPC generates a second ALT complete signal 146 for receipt by both the anchor RPC and the VLR-DN manager.

7. Inter-RPC ALT Via ISDN/PRI Using Switch Loopback 3 RPCs)

Figure 9:
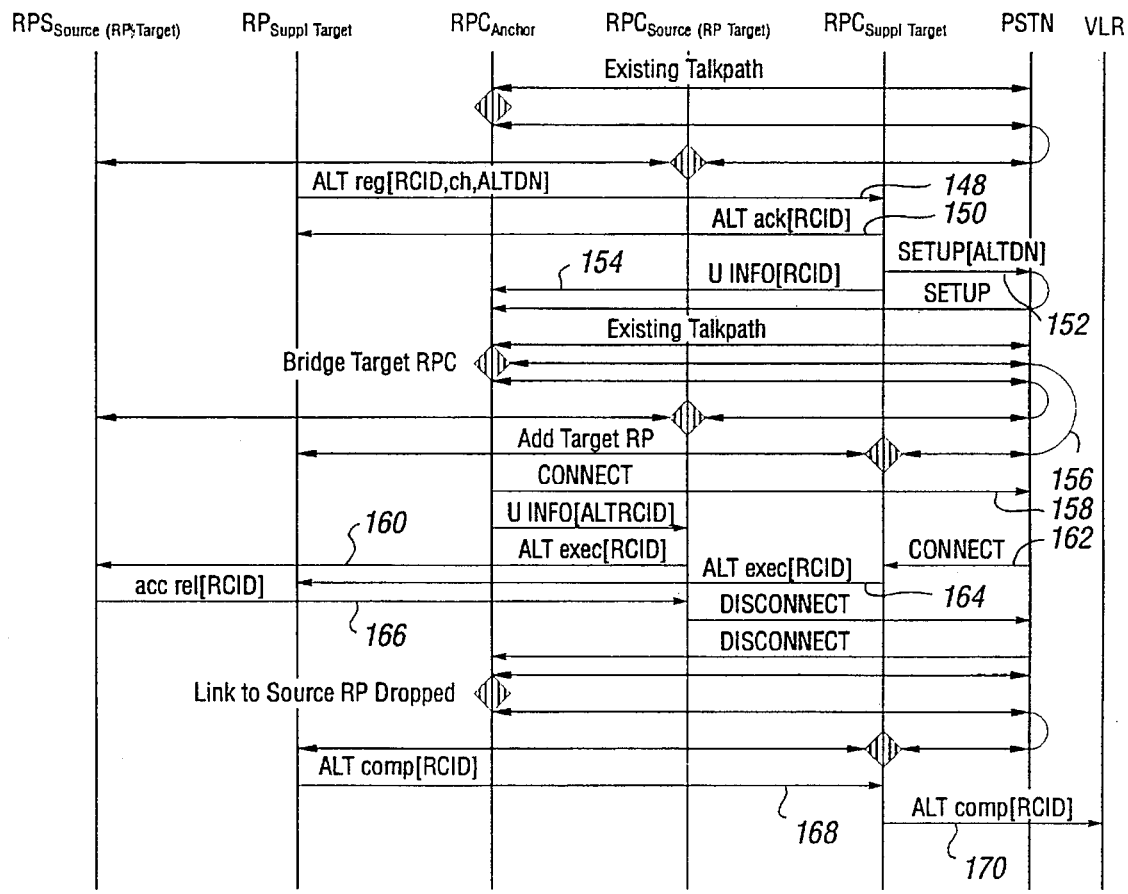
FIG. 9 is a schematic diagram illustrating the coordination of VLR and RP signals to determine and effect the routing of voice channels in an inter-RPC ALT via ISDN/PRI using switch loopback to supplemental RPs and RPCs.

Referring now to FIG. 9 of the drawings, the step of coordinating VLR and RP signals to determine and effect the routing of voice channels in inter-RPC transactions will be further described again with reference to the scenario where the RPCs are provided in electrical communication with each other via an ISDN.

As shown in FIG. 9, the "switch loopback" functionality provided by the present invention will be described with reference to a situation where it is necessary to control additional inter-RPC ALTs between target RPs/target RPCs and supplemental target RPs/supplemental target RPCs. As shown in FIG. 9, the method includes the initial step of assigning a supplemental voice channel at the supplemental target RP and generating a supplemental ALT request signal 148 for receipt by the supplemental target RPC identifying the assigned channel, the call RCID and the ALTDN. The method further includes generating a supplemental acknowledgement signal 150 at the supplemental target RPC for receipt by the supplemental target RP. Next, a supplemental ISDN call setup signal 154 is generated at the supplemental target RPC for receipt by the COS through the PSTN. This ISDN call setup signal requests the COS to setup a new call from the supplemental target RPC to the anchor RPC. A supplemental user information signal 152 is generated at the supplemental target RPC for receipt by the anchor RPC. This supplemental ISDN user information signal identifies the RCID of the call anchored at the anchor RPC for which an ALT has been requested.

By bridging the call to the identified ALTDN at the anchor RPC, a conference connection may be established between the supplemental target RP, the supplemental target RPC and the anchor RPC as shown at arrow 156. Thereafter, a first supplemental connect signal 158 is generated at the anchor RPC for receipt by the COS. Following generation of the first supplemental connect signal, a first supplemental ALT execute signal 160 is generated at the target RPC for receipt by the target RP. A second supplemental connect signal 162 is thereafter generated at the COS for receipt by the supplemental target RPC. Finally, a second supplemental ALT execute signal 164 is generated at the supplemental target RPC for receipt by the supplemental target RP.

In keeping with the invention, an access release signal 166 is thereafter generated at the target RP for receipt by the target RPC instructing the target RPC to release all radio resources associated with the RCID of the call. Next, a first supplemental ALT complete signal 168 is generated at the supplemental target RP for receipt by the supplemental target RPC. The first supplemental ALT complete signal is followed by a second supplemental complete signal 170 which is generated at the supplemental target RPC for receipt by the anchor RPC and the VLR-DN manager.

While the best mode for carrying out the invention has been described in detail, those familiar with the art to which this invention relates will recognize various alternative designs and embodiments for practicing the invention as defined by the following claims.

What is claimed is:

1. For use in a microcellular Personal Communications Services (PCS) system connected to the Public Switched Telephone Network (PSTN) through a Central Office Switch (COS), the system having a plurality of Radio Ports (RPs) each having a corresponding coverage area and provided in electrical communication with a corresponding Radio Port Controller (RPC), said RPCs provided in electrical communication with said COS to define a plurality of RPC serving areas for transmitting and receiving calls from mobile terminals registered therein, a method for controlling call processing, comprising:

providing a Metropolitan Area Network (MAN) in electrical communication with said RPCs;

providing a Visitor Location Register (VLR) for managing call information about said mobile terminals registered in said RPC serving areas, said VLR provided in electrical communication with said RPCs;

monitoring said RPs for any signals generated by said RPs indicating that a mobile terminal is attempting to register on said system, originate a call, initiate an ALT or disconnect a call;

monitoring said VLR for any inbound calls or signals generated by said VLR as to how to proceed with a current activity; and coordinating VLR and RP signals to determine and effect the routing of voice channels when a call origination, call delivery intra-RPC Automatic Link Transfer (ALT) or inter-RPC ALT is needed, including:

providing a source RP and a corresponding anchor RPC;

providing a target RP and a corresponding target RPC;

generating a first ALT request signal at said mobile terminal for receipt by said target RP, said first ALT request signal identifying the Radio Call Identifier (RCID) and voice channel of the current call anchored at said anchor RPC;

assigning a secondary voice channel at said target RP and generating a second ALT request signal for receipt by said target RPC identifying said assigned channel and said call RCID;

assigning a secondary voice channel at said target RP and generating a second ALT request signal for receipt by said target RPC identifying said assigned channel and said call RCID;

locating said anchor RPC by generating an ALT source request signal at said target RPC for receipt by said plurality of RPCs, said ALT source request signal identifying the RCID of said call anchored at said anchor RPC;

generating an ALT source response signal at said anchor RPC for receipt by said target RPC, said ALT source response signal identifying said call RCID and a logical channel on said MAN over which to receive voice signals;

bridging said call to said identified MAN channel at said anchor RPC so as to establish a conference connection between said target RP, said target RPC and said anchor RPC;

generating an ALT ready signal at said target RPC for receipt by said anchor RPC upon completion of said call bridge;

generating a first ALT execute signal at said anchor RPC for receipt by said source RP;

generating an access release signal at said source RP for receipt by said anchor RPC instructing said source RP to release all radio resources associated with the RCID of said call;

generating an ALT complete signal at said target RP for receipt by said target RPC; and generating ALT complete signals at said target RPC for receipt by said anchor RPC and said VLR.

2. For use in a microcellular Personal Communications Services (PCS) system connected to the Public Switched Telephone Network (PSTN) through a Central Office Switch (COS), the system having a plurality of Radio Ports (RPs) each having a corresponding coverage area and provided in electrical communication with a corresponding Radio Port Controller (RPC), said RPCs provided in electrical communication with said COS to define a plurality of RPC serving areas for transmitting and receiving calls from mobile terminals registered therein, a method for controlling call processing, comprising:

providing a Metropolitan Area Network (MAN) in electrical communication with said RPCs;

providing a Visitor Location Register (VLR) for managing call information about said mobile terminals registered in said RPC serving areas, said VLR provided in electrical communication with said RPCs; monitoring said RPs for any signals generated by said RPs indicating that a mobile terminal is attempting to register on said system, originate a call, initiate an ALT or disconnect a call;

monitoring said VLR for any inbound calls or signals generated by said VLR as to how to proceed with a current activity; and coordinating VLR and RP signals to determine and effect the routing of voice channels when a call origination, call delivery intra-RPC Automatic Link Transfer (ALT) or inter-RPC ALT is needed, including:

providing a source RP and a corresponding anchor RPC;

providing a target RP and a corresponding target RPC;

generating a first ALT request signal at said mobile terminal for receipt by said target RP, said first ALT request signal identifying the Radio Call Identifier (RCID) and voice channel of the current call anchored at said anchor RPC and the ISDN DN of said anchor RPC (ALTDN);

assigning a secondary voice channel at said target RP and generating a second ALT request signal for receipt by said target RPC, said second ALT request signal identifying said assigned channel, said call RCID and said ALTDN;

generating an acknowledgement signal at said target RPC for receipt by said target RP;

generating an ISDN call setup signal at said target RPC for receipt by said COS, said ISDN call setup signal requesting said COS to setup a new call from said target RPC to said anchor RPC;

generating an ISDN user information signal at said target RPC for receipt by said anchor RPC, said ISDN user information signal identifying the RCID of said call anchored at said anchor RPC for which an ALT has been requested;

generating a first connect signal at said anchor RPC for receipt by said COS;

generating a first ALT execute signal at said anchor RPC for receipt by said source RP;

generating an access release signal at said source RP for receipt by said anchor RPC instructing said anchor RPC to release all radio resources associated with the RCID of said call;

generating a first ALT complete signal at said target RP for receipt by said target RPC; and generating a second ALT complete signal at said target RPC for receipt by said anchor RPC and said VLR.

3. The method of claim 2, further adapted to control additional inter-RPC ALTs between said target RP/target RPC and supplemental target RPs/supplemental target RPCs, comprising:

providing a supplemental target RP and a corresponding supplemental target RPC;

assigning a supplemental voice channel at said supplemental target RP and generating a supplemental ALT request signal for receipt by said supplemental target RPC identifying said assigned channel, said call RCID and said ALTDN;

generating a supplemental acknowledgement signal at said supplemental target RPC for receipt by said supplemental target RP;

generating a supplemental ISDN call setup signal at said supplemental target RPC for receipt by said COS, said ISDN call setup signal requesting said COS to setup a new call from said supplemental target RPC to said anchor RPC;

generating a supplemental ISDN user information signal at said supplemental target RPC for receipt by said anchor RPC, said supplemental ISDN user information signal identifying the RCID of said call anchored at said anchor RPC for which an ALT has been requested;

bridging said call to said identified ALTDN at said anchor RPC so as to establish a conference connection between said supplemental target RP, said supplemental target RPC and said anchor RPC;

generating a first supplemental connect signal at said anchor RPC for receipt by said COS;

generating a first supplemental ALT execute signal at said target RPC for receipt by said target RP;

generating a second supplemental connect signal at said COS for receipt by said supplemental target RPC;

generating a second supplemental ALT execute signal at said supplemental target RPC for receipt by said supplemental target RP;

generating an access release signal at said target RP for receipt by said target RPC instructing said target RPC to release all radio resources associated with the RCID of said call;

generating a first supplemental ALT complete signal at said supplemental target RP for receipt by said supplemental target RPC; and generating a second supplemental ALT complete signal at said supplemental target RPC for receipt by said anchor RPC and said VLR.

* * * * *